United States Patent [19]

Rutledge

[11] 3,835,225

[45] Sept. 10, 1974

[54] CHEMICAL MODIFICATION OF RICE

[75] Inventor: James E. Rutledge, Baton Rouge, La.

[73] Assignee: Research Corporation, New York, N.Y.

[22] Filed: July 20, 1972

[21] Appl. No.: 273,533

[52] U.S. Cl................... 426/208, 426/331, 426/442
[51] Int. Cl............................. A23l 1/10, A23l 3/34
[58] Field of Search........ 99/80 PS, 80 R, 186, 139; 426/208, 331, 442

[56] References Cited
UNITED STATES PATENTS

| | | | |
|---|---|---|---|
| 3,238,193 | 3/1966 | Tuschhoff et al. | 99/139 X |
| 3,369,910 | 2/1968 | Ganz | 99/139 |
| 3,525,672 | 8/1970 | Wurzburg et al. | 99/139 |
| 3,526,511 | 9/1970 | Rockland | 99/80 PS |

*Primary Examiner*—Raymond N. Jones
*Attorney, Agent, or Firm*—Oblon, Fisher, Spivak, McClelland & Maier

[57] ABSTRACT

The heat processability of edible rice grains are enhanced by treating the rice grain with a cross-linking agent of the type capable of cross-linking starch, and then subjecting the rice grain to cross-linking conditions for a time sufficient to enhance the heat resistance and improve the swelling properties of the grain.

7 Claims, 3 Drawing Figures

CANNING STABILITY OF CROSS-LINKED RICE
1. CROSS-LINKED    2. TREATED CONTROL
3. UNTREATED CONTROL    4. COMMERCIAL PARBOILED

DISTORTION OF RICE GRAINS DURING CANNING

CANNED RICE AFTER DRAINING OFF THE LIQUID

CHEMICAL MODIFICATION OF RICE

BACKGROUND OF THE INVENTION

1. Field of the Invention

This invention relates to a method of improving the resistance of rice to heat degradation, and to products resulting therefrom.

2. Description of the Prior Art

Rice kernels are physically composed of an agglomeration of smaller granules, each of a size of about 3 – 5 microns in diameter. These granules rely upon relatively weak intermolecular hydrogen bonds for their physical integrity. When these bonds are subjected to even mild heating conditions, particularly in a water-containing medium, they tend to become increasingly weaker so that the granules begin to irreversibly swell. If heating is continued, complete rupture of the bonds will occur and a paste-like starch product will result. Thermal degradation of rice kernels under the application of heat has severely hindered the use of whole rice in heat processed foods, such as canned soups and the like, and it was not until the discovery of the technique of parboiling of rice that it became possible to commercialize heat processed foods containing whole rice.

Even parboiled rice, however, proved to be only a partial solution to the problem, since it was found that most varieties of rice are incapable of resisting any but moderate processing conditions and limited moisture conditions, which often necessitates the use of specialized equipment.

A wide variety of rice-containing foods could therefore not be fully processed, so that a need continued to exist for a method of enhancing the heat resistance of rice, particularly when the rice is heat processed over extensive periods of time.

It was first considered that the greatest probability of success in resolving this problem was in the development of more heat resistant rice species, see Webb, et al. "Laboratory Parboiling Apparatus, and Methods of Evaluating Parboil Canning Stability of Rice," Cereal Chemistry 47 : 708(1970). It was found, for instance, that certain long grain varieties of rice (Oryza Sativa L.), notably Bluebell and Belle Patana rice, when parboiled, have somewhat greater heat resistance than other varieties, showing a solid loss of 18 percent and 17 percent, respectively, when heated to 240°F. for 60 minutes. Jojutla, a Mexican variety of rice, has been shown to be even more resistant to heat, showing a solid loss of only 9 percent when heated under the same conditions. Despite extensive research in attempting to develop new strands of rice, no new species has been reported which possesses fully satisfactory heat and water resistance.

In general, to be commercially acceptable, rice used in soups and other semi-liquid media, should be white, with separate non-cohesive kernels and with a minimum amount of longitudinal splitting and fraying of edges and ends, even after processing, and the canning liquor should be clear and devoid of excessive starch. Regardless of the variety of rice used, however, whether parboiled or not, it was found that these requirements could not be satisfactorily achieved regardless of the variety of rice used if the processing treatment involved heating for extensive periods of time in the presence of significant moisture.

Another difficulty with parboiling to achieve heat resistance, is that the textural quality of the rice after heat processing will be influenced by varietel differences, age, parboiling treatment, pH, fat content, salt concentration and blanch time. It would be desirable, of course, to provide a technique of treating rice which would reduce or eliminate the importance of these factors or the quality of the heat processed end product.

It has been disclosed in the prior art that a wide variety of starch materials, such as rice starch, can be cross-linked with a variety of cross-linking agents for a variety of purposes. For instance, it is known to cross-link rice starch for use as a thickener or stabilizer in foods, such as pie fillings, salad dressings, gravies, puddings and soups, see, for instance, U.S. Pat. No. 3,525,672. It is also known to cross-link starches, such as rice starch, so as to prevent gelatinzation at moderate temperatures, see U.S. Pat. No. 3,014,901. It is also known to cross-link starches, including rice starch, to render it freeze-thaw resistant, see U.S. Pat. No. 3,369,910. Other references disclosing cross-linking of starches include, for instances, U.S. Pat. Nos. 2,754,232; 2,500,950; 2,929,811; 2,989,521; 3,014,901; 3,238,193; 3,275,576; 3,277,025; 3,414,530; 3,420,788; 3,479,392; and 3,542,759, which are only cited as being representative of the extent of interest in cross-linking of starches.

It has not heretofore been recognized, however, that whole grain or kernel rice, as contrasted with rice starch, can be treated with a cross-linking agent, nor has it been recognized that if whole grain or kernel rice is properly treated with a cross-linking agent that the swelling and heat stability of the rice kernel or grain will be markedly improved, so that the rice will have a greater resistance to overcooking as compared with the prior art technique of parboiling.

SUMMARY OF DISCLOSURE

Accordingly, it is one object of this invention to provide a method of rendering whole grain or kernel rice more heat-resistant so that it can be included in heat processed foods.

It is another object of this invention to provide a technique of enhancing the heat resistance of rice, which is not dependent upon the particular variety of rice used.

It is another object of this invention to provide a method of enhancing the heat resistance of whole grain or kernel rice in a simple, economically attractive manner.

It is a still further object of this invention to provide a technique for treating rice so that it can be used in heat processed foods, wherein the textural quality of the rice will not be significantly influenced by varietal differences, age, parboiling treatment, pH, fat content, salt concentration or blanch time.

These and other objects, as will hereinafter become more readily apparent, have been attained by the discovery that the heat-resistance of whole grain, or kernel rice, is considerably enhanced by uniformly cross-linking the starch molecules within the rice grain or kernel, under suitable conditions such that the integrity of the grain or kernel is preserved.

DETAILED DESCRIPTION OF PREFERRED EMBODIMENTS

Figure 1:
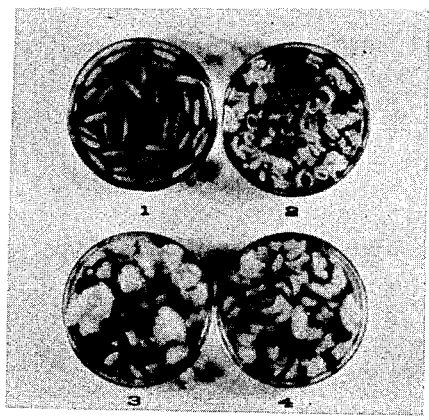

According to the present invention, the starch content in whole grain or kernel rice, is cross-linked to enhance the strength of the granules within the grain or kernel, and to enhance their resistance to swelling and rupture. The preferred cross-linking agents which are useful for this purpose are the di-or polyfunctional cross-linking agents, which are capable of reacting with at least two of the hydroxy groups of the starch molecules in the granules to reinforce the hydrogen bonds with either bonds. For instance, suitable cross-linking agents include the aliphatic halides, such as propylene dichloride, dichloropentane, ethylene dibromide, glycerol-1,3-dichlorohydrin; ether forming epoxy halogen compounds, particularly those of the formula:

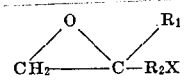

wherein $R_1$ is selected from the group consisting of hydrogen and lower alkyl, $R_2$ is a lower alkyl, and X is a halogen atom, such as epichlorohydrin and epibromohydrin; the polyfunctional reagents, such as cyanuric chloride, phosphorus oxychloride, sodium metaphosphate and polymetaphosphate; aldehydes, such as formaldehyde, acrolein; 1-octenyl succinic anhydride, adipic anhydride, citric acid and acetic anhydride combination; 1,2,3,4-diepoxy butane, bis-epoxy propyl ether, ethylene glycol bis-epoxy propyl ether, 1,4-butanediol-bis-epoxy propyl ether. Epichlorohydrin is a particularly desirable cross-linking agent, since F.D.A. standards recognize the safety of etherifying starch with up to 0.3 percent epichlorohydrin.

When the cross-linked rice is cooked in water at temperature which weaken or destroy the hydrogen bonds, the integrity of the swollen granule is still maintained by virtue of the chemical cross-links.

Due to the high degree of organization within a whole grain or kernel of rice, uniform cross-linking is considerably more difficult than cross-linking of rice starch as was carried out in the prior art. In particular, it was not heretofore recognized that uniform cross-linking of rice to a degree sufficient to insure the integrity of the rice upon subsequent heating could be accomplished by cross-linking the starch within the rice granules.

In carrying out the cross-linking, it is often desirable to first activate the starch molecules in the grain molecules. This can be accomplished by treating the grains with a dilute aqueous solution of a strong base in a salt, such as sodium hydroxide and sodium chloride. This converts the starch molecule to a more easily reactable salt. Any alkali salt can be used for this purpose, including sodium hydroxide, potassium hydroxide, sodium carbonate or the like.

The activated rice is then treated with a cross-linking agent in an aqueous solution while stirring for a period of time sufficient to cross-link the starch molecule within the granule. The actual conditions of cross-linking, of course, will depend upon the particular cross-linking agent used. When epichlorohydrin is used as the cross-linking agent, for instance, satisfactory results are attainable when the reaction is carried out over a period of 2 to 6 hours at a temperature of from about room temperature to 50°C. in a basic solution.

The presence of neutral salts, such as the alkali metal or alkali earth metal salts which hydrolyze to yield substantially neutral aqueous solutions, tend to increase the reactivity of the starch. Suitable salts for this purpose include NaCl, NaBr, $Na_2SO_4$, $NaNO_2$, NaI, KCl, KBr, $KNO_3$, KI, $CaCl_2$, $CaSO_4$, $Ca(NO_3)_2$, $SrCl_2$, $Sr(NO_3)_2$, $BaCl_2$, $Ba(NO_3)_2$, and the like. The salts shift the absorption equilibrium such that alkali absorption is enhanced, probably by decreasing the effective water concentration through solvation. In addition, the presence of these neutral salts in the alkali slurries reduces the tendency of the starch granules to swell at high alkali concentrations, or to gelatinize as they become increasingly disorganized by the introduction of substituent chemical groups. Moreover, these salts may also retard the hydrolysis of the cross-linking reagent, for instance, if the reagent is epichlorohydrin, thus permitting greater penetration of the reagent into the granule to provide more uniform cross-linking.

In general, it is desirable to admix the cross-linking agent with the rice granules in an amount of from $1 \times 10^{-6}$ moles/gm of rice to $3.5 \times 10^{-4}$ moles/gm of rice. Less than $1 \times 10^{-6}$ moles/cm is generally insufficient to provide sufficient cross-linking to achieve improved heat resistance. Greater than $3.5 \times 10^{-4}$ moles/gm will not provide appreciably better results. When epichlorohydrin is the cross-linking reagent, the reaction is considered to proceed as follows:

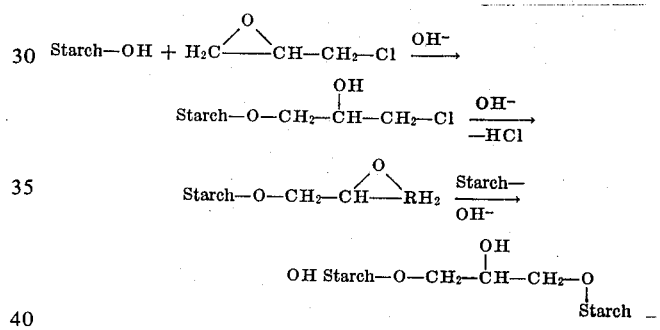

Under the alkaline conditions required for cross-linking, partial hydrolysis of epichlorohydrin to glycerol can occur. Thus, it is desirable to prepare the epichlorohydrin mixture just prior to use.

Following cross-linking, the rice is separated from the reaction system by simple decantation, and is washed until the quantity of residual unreacted cross-linking agent drops to a level acceptable to F.D.A. standards. If the cross-linking agent is an alkali salt-epichlorohydrin mixture, it is desirable to neutralize the rice with a mild aqueous acid solution. The alkali used in the activation step causes a yellow discoloration in the grain. In the course of neutralizing the alkali, the yellow color will disappear. Neutralization can require a period of from 1 to 16 hours, when carried out at room temperature.

A wide variety of rice can be treated in this manner, such as Starbonnet, Bluebelle, Belle Patna, Texas Patna, Bluebonnet, Dawn, Patna, Toro, Saturn, Nato, Roses, Nova, Pearl, Zenith, and Rexoro. Of course, since new varieties are being propagated each year, this list is necessarily non-inclusive.

Having now generally described the invention, a further understanding can be attained by reference to certain specific Examples which are provided herein for purposes of illustration only and are not to be construed as limiting unless otherwise so specified.

EXAMPLE 1

Cross-linking White Rice with Epichlorohydrin 50 grams of white milled rice (Starbonnet) was placed in a 250 ml. Erlenmeyer flask. Fifty ml. of 0.2N NaOH and 3.0 gm. of NaCl were added and the mixture was allowed to stand for 2 hours.

After soaking, 13.0 ml. of a freshly prepared 1 percent epichlorohydrin solution (1 ml. epichlorohydrin made up to 100 ml. with 0.2 NaOH) was added to the flash and allowed to react on a shaker for 4 hours. The flask was closed with a rubber stopper to prevent loss of the volatile epichlorohydrin.

After cross-linking, the alkali-salt-epichlorohydrin mixture was decanted. The rice was washed several times with tap water and resuspended in 50 mls. of water and neutralized slowly by adding drops of 4N HCl. The neutralization step was carried out over a period of 8 hours, after which the rice was washed thoroughly in tap water and air dried at room temperature.

The heat resistance of the rice grains was determined as follows: 20 grams of rice were weighed and placed in a 211 × 400 C-enameled cans. Each can was filled with boiling water (pH 7), after which the cans were sealed and retorted at 240°F. for 60 minutes, and thereafter quickly cooled in running tap water. The evaluation processes were carried out as follows: (a) solid loss: Solid loss was obtained by calculating the difference in weight between the dry matter content of the original sample and the dry matter content of the sample retained after washing over a 1.68 mm. wire mesh screen as outlined further in Webb, et al., Laboratory Parboiling Apparatus and Methods of Evaluating Parboiled-Canning Stability of Rice, Cereal Chemistry, 47 : 708(1970). (b) Elongation ratios: Length of canned rice was divided by the length of the raw rice. (c) Subjective Rating: Rice samples were grouped subjectively into 5 categories based on general appearance and condition of surface. Highest marks were given for rice which remained white with separate, non-cohesive kernels, and with a minimum amount of longitudinal splitting and fraying at edges and ends.

In order to evaluate the heat resistance of the cross-linked rice, it was tested, as indicated above, and compared with the original untreated rice, commercial parboiled rice (Bluebelle), and with rice treated in the same manner as the cross-linked, except that the cross-linking agent was omitted. The results are shown in Table I.

TABLE I

Canning Stability With Various Treatments[a]

| Treatment | % Solid Loss | Elongation Ratio | Subjective Rating |
|---|---|---|---|
| Cross-linked | 5.2 | 1.86 | 1—Excellent |
| Untreated (Control) | 25.5 | 1.28 | 5—Poor |
| Treated (Control) | 32.5 | —[b] | 5—Poor |
| Commercial Parboiled (Canners Quality) | 23.7 | 1.58 | 3—Fair |

[a]Average of 6 analyses.
[b]Grains were too distorted for measurement.

Figure 2:
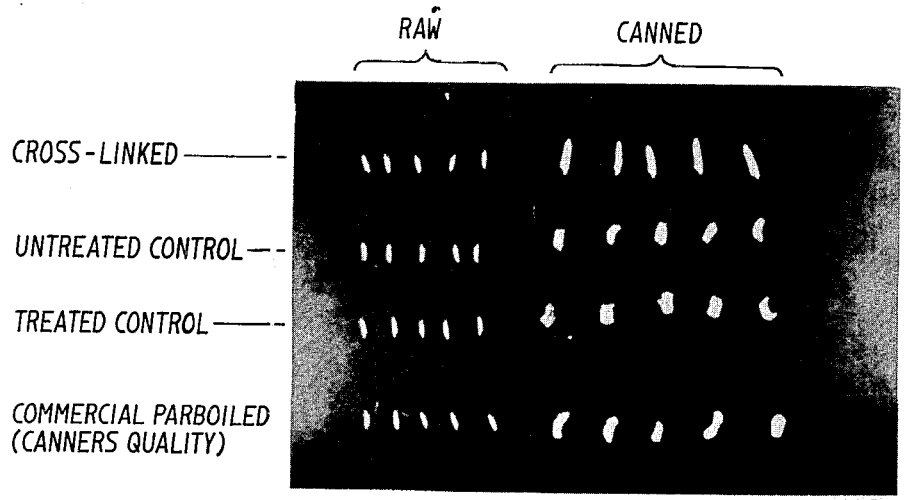
Figure 3:
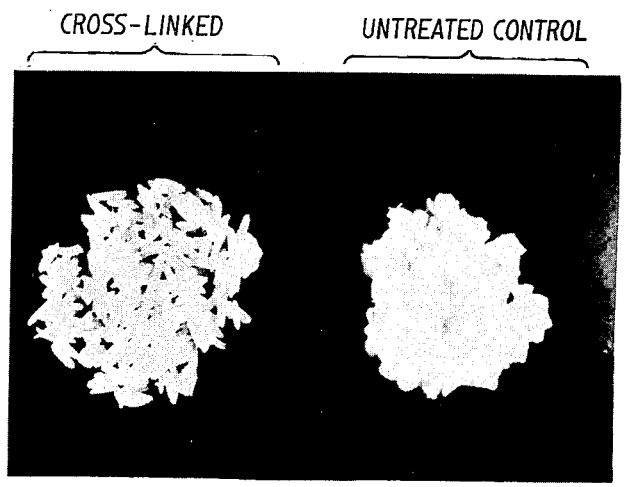

As above indicated, the cross-linked rice was found to have a solids loss of 5.2 percent which was 78 percent less than that obtained from commercial parboiled samples. The low solids loss of the cross-linked samples is evidenced by the clarity of the canning liquor as can be seen in FIG. 1. FIGS. 1, 2, and 3 demonstrate that the cross-linked rice had a greater resistance to overcooking while maintaining kernel stability. Less distortion of the grain was reflected in the elongation ratio and is clearly evident in FIG. 2.

Under the Regulations of the Federal Food, Drug and Cosmetic Act, starch can be etherified with epichlorohydrin in concentration of up to and including 0.3 percent. Consequently, this particular restriction was employed in the treatment of the rice samples. Analysis of the reaction filtrates reveals that 48.7 percent of the 0.3 percent epichlorohydrin added (Based on the weight of rice) remained unreacted. Thus, if the cross-linking time had been extended, one would expect a higher level of cross-linking.

EXAMPLE 2

Cross-linking Parboiled Rice with Epichlorohydrin

The heat processability of parboiled rice can also be enhanced by treating the parboiled grain with a cross-linking agent of the type capable of cross-linking starch.

100 gm. of parboiled Bluebelle rice was weighed in a 500 ml. Erlenmeyer flask. 200 ml. of a 0.1 N NaOH solution and 10 gm. of NaCl were added to the rice. After soaking, 26 ml. of freshly prepared 1 percent epichlorohydrin solution (1 ml. of epichlorohydrin made up to 100 ml. with 0.1N NaOH) was added to the flask and allowed to react on a shaker for 4 hours. The flask was closed to prevent loss of the volatile epichlorohydrin. After cross-linking, the alkali-salt-epichlorohydrin mixture was decanted and the rice washed several times with tap water and finally resuspended in 100 ml. of water. About 4.5 ml. of 4N HCl was added slowly drop by drop throughout 4 hours. The pH was maintained above 4, otherwise the rice grain may undergo acid modification which is characterized by heavy starch leaching during canning. The neutralized grains were thoroughly washed with tap water and air dried at room temperature.

Canning Evaluation: Forty cans of rice was used in the elevation, twenty containing the epichlorohydrin treated rice and the remaining twenty using the untreated parboiled sample. Both treated and control rice were canned at pH 7 and 5 which resulted in a 2 × 2 factorial arrangement of treatments. Fifteen grams of rice was used in each can. The cans were filled to a ½ in. head space with boiling distilled water of the appropriate pH and processed at 240°F. for 60 minutes in a conventional still retort after which the cans were water cooled.

Five cans from each treatment combination were used in the objective evaluation concerning percentage solids loss during canning. The solid loss was obtained by calculating the difference in weight between the dry matter content of the original sample and the dry matter content of the sample retained after washing over a 1.68 mm. wire screen as outlined by Webb and Adair (1970). The remaining five cans in each treatment combination were evaluated subjectively by 10 judges for color, off-flavor, cohesiveness and doneness using a 5 point hedonic sale similar to that described by Batcher, et al., Development and application of methods for evaluating cooking and eating quality of rice. Rice Jour. 59 : 4 (1956).

The effects of cross-linking starch in parboiled race also appears to greatly increase its stability to thermal processing conditions. Data concerning percentage solids loss is presented in Table II. Cross-linked samples showed 76.5 percent less leaching as opposed to untreated controls. Increased granular stability through cross-linking was no doubt responsible for the overall stability of the cross-linked samples as well as their resistance to pH extremes.

The treatment means for the subjective evaluation concerning color, flavor, cohesiveness, and doneness are presented in Table III. Panel members consistently preferred the cross-linked samples over the controls.

TABLE II

Treatment Means for Percentage Solid Loss

| | Treated | | Control | |
|---|---|---|---|---|
| | pH 7 | pH 5 | pH 7 | pH 5 |
| % Solid Loss | 7.32 | 6.62 | 23.14 | 36.06 |

TABLE III

Treatment Means For The Subjective Evaluation

| | Treated | | Control | |
|---|---|---|---|---|
| | pH 7 | pH 5 | pH 7 | pH 5 |
| Color | 4.88 | 4.78 | 3.72 | 3.84 |
| Cohesiveness | 4.96 | 5.00 | 1.70 | 1.60 |
| Flavor | 4.96 | 4.78 | 4.30 | 4.40 |
| Doneness* | 3.16 | 3.18 | 1.14 | 1.20 |

*In the case of doneness, a score of 3 was excellent, whereas a score of 5 or 1 was considered underdone or mushy, respectively.

Cross-linking the starch in rice appears slightly more difficult than is the case with powdered or granular starch, evidently due to the higher degree of organization within the kernel or grain. In the same respect, I have noted that white rice was more difficult than parboiled rice to cross-link which has resulted in slight modifications of the activation and cross-linking treatment applied on parboiled rice as opposed to those described on white rice earlier. In the case of parboiled rice, lower concentrations of alkali are required for activation than for white rice. Salt concentrations, however, was increased in case of parboiled rice to retard the greater swelling tendency. Also, the greater water absorption tendency of parboiled rice reduces the neutralization time substantially. In support of the observation that white rice is more difficult to cross-link, data collected indicates that 61.7 percent of the epichlorohydrin added to parboiled rice reacted in four hours as compared to 51.3 percent for white rice.

EXAMPLE 3

Storage Stability of Epichlorohydrin Treated White Rice

White rice (Bluebelle) was cross-linked in the manner described in Example 1, using epichlorohydrin as the cross-linking reagent. 10 – 20 gm. samples of each, parboiled (Bluebelle) and the cross-linked white Bluebelle, were placed in 211 × 400 C-enameled cans filled with boiling tap water and sealed. The cans were processed at 240°F. for one hour and rapidly cooled in water.

Five cans from each group were opened after cooling and the percentage solids loss determined by the method of Webb and Adair (1970). The remaining cans were stored for six months before analysis.

The cross-linked rice samples had initial solid losses of 5.3 percent compared to 5.6 percent after 6 months' storage, contrasted to 23.1 percent initial and 27.0 percent after 6 months' storage for the commercial parboiled samples. The data are presented in Table IV, which indicate that cross-linked samples showed greater shelf-life stability than the commercial parboiled samples as well as a considerable overall improvement.

TABLE IV

Treatment Means For Percentage Solids Loss

| Treated | | Control | |
|---|---|---|---|
| 0 | 6 months | 0 | 6 months |
| 5.3 | 5.6 | 23.1 | 27.0 |

EXAMPLE 4

Cross-linking White Rice with Phosphorus Oxychloride

White rice (Belle Patna) was cross-linked using phosphorus oxychloride as the cross-linking reagent. The rice was treated in the same manner as described in Example 1, except that 1 percent phosphorus oxychloride (based on the weight of the rice) was used instead of 0.3 percent epichlorohydrin. The rice showed a solids loss of 5 percent after canning at 240°F. for 60 minutes.

EXAMPLE 5

Cross-linking Parboiled Rice with Phosphorus Oxychloride

Parboiled rice (Bluebelle) was cross-linked using phosphorus oxychloride as the cross-linking reagent. The rice was treated in the same manner as described in Example 2, except that 1 percent phosphorus oxychloride (based on the weight of the rice) was used instead of 0.3 percent epichlorohydrin. The rice had a low solid loss and a clear canning liquor indicative of excellent thermal stability after canning at 240°F. for 60 minutes.

EXAMPLE 6

Cross-linking Parboiled Rice with Sodium Trimetaphosphate

Parboiled rice (Bluebelle) was cross-linked using sodium trimetaphosphate at the cross-linking reagent. The rice was treated in the same manner as described in Example 2, except that 2 percent sodium trimetaphosphate (based on the weight of the rice) was used instead of epichlorohydrin. The rice had a low solids loss and was similar to that produced by epichlorohydrin.

EXAMPLE 7

Limited Moisture Canning

Rice cross-linked in the manner described in Examples 1, 2, 3, 4, 5, and 6 were canned under limited moisture conditions resulting in an excellent rice with no sticking or clumping of the grains. The cross-linked rice was cooked in excess water until considered done, drained, packed into 211 × 400 C-enameled cans and sterilized by processing at 240°F. for 1 hour.

EXAMPLE 8

Reducing Stickiness of Rice

Certain varieties of rice are known to be sticky after cooking. This has generally been attributed to higher amylopectin content of these varieties. Several of these varieties (Pearl, Nova, Nato and Saturn) were cross-linked in the manner described in Examples 1, 2, 4, 5 and 6, which was successful in eliminating the stickiness usually encountered when cooked under home procedures.

EXAMPLE 9

Cross-linking Reduces the Need for Blanching Prior to Canning Rice

Rice processed in the manner described in Examples 1, 2, 4, 5 and 6 required no blanching prior to canning to prevent clumping or sticking to the bottom of the cans, whereas in control samples usually one-third to one-half of the rice was stuck or matted on the bottom of the can. Blanching is a time-consuming operation designed primarily for reducing the clumping tendency of rice.

In the specific Examples, the reactions were carried out at room temperature (72°F.). This temperature requires a minimum amount of equipment.

Having now fully described the invention, it will be apparent to one of ordinary skill in the art that many changes and modifications can be made thereto without departing from the spirit or scope of the invention as set forth herein. ACCORDINGLY,

What is claimed as new and desired to be secured by Letters Patent is:

1. A process for improving the heat processability of edible rice grain which comprises treating said rice grain with a cross-linking agent capable of cross-linking starch and subjecting said rice grain to cross-linking conditions for a time sufficient to enhance the heat resistance of said grain.

2. The process of claim 1, wherein said cross-linking agent is selected from the group consisting of di- and polyfunctional cross-linking agents capable of reacting with the hydroxyl groups of the starch.

3. The process of claim 2, wherein said cross-linking agent is selected from the group consisting of aliphatic halides, ether forming halogen compounds of the formula:

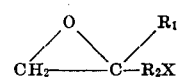

wherein $R_1$ is selected from the group consisting of hydrogen and lower alkyl, $R_2$ is a lower alkyl, and X is a halogen atom, cyanuric chloride, phosphorus oxychloride, sodium metaphosphate and polymetaphosphate, formaldehyde, acrolein, 1-octenyl succinic anhydride, adipic anhydride, citric acid and acetic anhydride combination, 1,2,3,4-diepoxy butane, bis-epoxy propyl ether, ethylene glycol bis-epoxy propyl ether, 1,4-butanediol-bis-epoxy propyl ether.

4. The process of claim 3, wherein said cross-linking agent is epichlorohydrin.

5. The process of claim 4, wherein said rice grain is treated with epichlorohydrin at a temperature of from room temperature to 50°C.

6. The process of claim 1, wherein said cross-linking agent is used in an amount of from $1 \times 10^{-6}$ to $3.5 \times 10^{-4}$ moles/gm of rice.

7. Edible rice treated by the process of claim 1.

* * * * *